(12) United States Patent
Harata et al.

(10) Patent No.: US 7,252,397 B2
(45) Date of Patent: Aug. 7, 2007

(54) ANGLE SELECTIVE REFLECTION SHEET

(75) Inventors: Hiroaki Harata, Yokohama (JP); Hiroaki Miura, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 100 days.

(21) Appl. No.: 10/853,755

(22) Filed: May 26, 2004

(65) Prior Publication Data
US 2004/0263976 A1    Dec. 30, 2004

(30) Foreign Application Priority Data
Jun. 11, 2003   (JP)   ............... 2003-167016

(51) Int. Cl.
G02B 5/124   (2006.01)
(52) U.S. Cl. .................................... 359/543
(58) Field of Classification Search ............... 359/543
See application file for complete search history.

(56) References Cited

U.S. PATENT DOCUMENTS 3,806,233 A * 4/1974 Stefano .................... 359/851
4,678,280 A * 7/1987 Blom ........................ 264/1.37
5,054,900 A * 10/1991 Simson ...................... 359/851

FOREIGN PATENT DOCUMENTS

| EP | 1 179 628 A1 | 2/2002 |
| JP | 2001-114149 A | 4/2001 |
| JP | 2001-122044 A | 5/2001 |

OTHER PUBLICATIONS

Japanese Industrial Standard, "Specular glossiness—Methods of measurement", JIS Z 8741, 1997, pp. 1-11.

* cited by examiner

Primary Examiner—Euncha P. Cherry
(74) Attorney, Agent, or Firm—Foley & Lardner LLP

(57)   ABSTRACT

An angle selective reflection sheet which is comprised of an angle selective transparent sheet having a characteristic of selectively reflecting light according to an incident angle of incident light to the angle selective transparent sheet, and a reflection layer laminated on a surface of the angle selective transparent sheet. The angle selective reflection sheet is preferably applied to surface members of an instrument panel, a door trim, a rear parcel shelf, a pillar garnish and a steering wheel.

10 Claims, 6 Drawing Sheets

ANGLE SELECTIVE REFLECTION SHEET

BACKGROUND OF THE INVENTION

The present invention relates to an interior surface member for a vehicle, and more particularly to a sheet which improves a thermal circumstance in a vehicle passenger compartment when the sheet is employed as an interior surface member of the vehicle.

It is well known that an ambient temperature in a vehicle passenger compartment becomes very high when the vehicle is parked under a burning sun. It is reported that in the summer months in Japan an ambient temperature of a vehicle passenger compartment under the burning sun reaches around 70° C., an upper surface of an instrument panel reaches around 100° C., and surfaces of a ceiling and seats reach around 70° C. Therefore, a vehicle occupant feels discomfort when getting in a vehicle under this condition. Further, since interiors and seats in a passenger compartment radiate the stored heat, such stored heat makes the vehicle occupant discomfort and requires excessive energy consumption for air conditioning the heated passenger compartment.

Japanese Published Patent Application Nos. 2001-114149 and 2001-122044 disclose a method of reflecting near infrared radiation by adding far infrared radiation reflecting pigment into an interior surface member.

SUMMARY OF THE INVENTION

However, since such a method is arranged to randomly mix such far infrared radiation pigment in resin for the interior surface member, such interior surface member cannot effectively reflect near infrared radiation. Further, since visual light of the solar radiation mainly heats interior surfaces, the proposed method cannot gain a desired advantage of suppressing the temperature rise in a vehicle passenger compartment.

It is therefore an object of the present invention to provide a material which is capable of effectively reflecting solar energy including visible light so as to suppress the temperature rise of the interiors when applied to surface members of vehicle interiors.

Another object of the present invention is to provide a material which is capable of suppressing a windshield reflection of the material while maintaining the visible light reflection characteristic.

An aspect of the present invention resides in an angle selective reflection sheet which comprises an angle selective transparent sheet that has a characteristic of selectively reflecting light according to an incident angle of incident light to the angle selective transparent sheet and a reflection layer that is laminated on a surface of the angle selective transparent sheet.

Another aspect of the present invention resides in a vehicle which comprises an angle selective reflection sheet comprising an angle selective transparent sheet and a reflection layer. The angle selective transparent sheet has a characteristic of selectively reflecting light according to an incident angle of incident light to the angle selective transparent sheet. The reflective layer is laminated on a surface of the angle selective transparent sheet. The angle selective reflection sheet is used as a surface member of at least one of an instrument panel, a door trim, a rear parcel shelf, a pillar garnish and a steering wheel.

A further aspect of the present invention resides in a method of producing an angle selective reflection sheet. The method comprises an operation of obtaining an angle selective transparent sheet by alternately laminating and connecting a transparent sheet and a light shielding sheet and by slicing a block of the laminated sheets along the sheet-laminated direction of the block, and an operation of laminating a reflection layer on a surface of the angle selective transparent sheet.

The other objects and features of this invention will become understood from the following description with reference to the accompanying drawings.

DETAILED DESCRIPTION OF THE INVENTION

Figure 1:
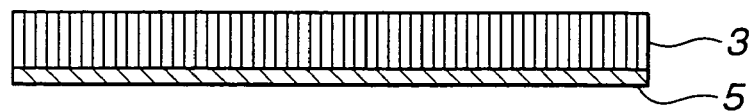
FIG. 1 is a view showing a structure of an angle selective reflection sheet according to the present invention, wherein a reflection layer is laminated on a sheet having an angle selective transparency.

Referring to the drawings, there is discussed a embodiment of an angle selective reflection sheet and a vehicle employing the angle selective reflection surface member in accordance with the present invention.

FIG. 1 shows an angle selective reflection sheet which is constructed by laminating a reflection layer 5 on an angle selective transparent sheet 3 according to the present invention.

Figure 2:
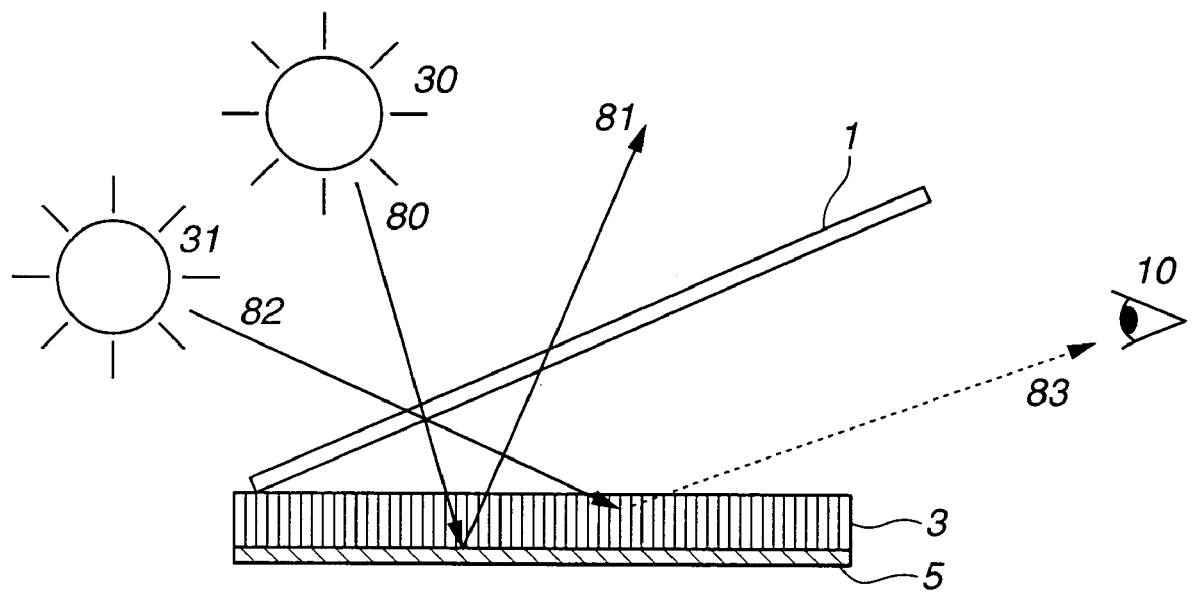
FIG. 2 is an explanatory view explaining a reflection characteristic dependent of a light incident angle.

FIG. 2 is a view representing a case that the angle selective reflection sheet of FIG. 1 is adapted to an instrument panel of a vehicle. When the sun 30 is positioned at a high position corresponding to that in broad daylight so as to act as a high-position solar radiation source, an incident light 80 of a solar radiation reaches angle selective transparent sheet 3 through a windshield 1 into the vehicle compartment, and is then reflected by a reflection layer 5 after passing through angle selective transparent sheet 3. A reflection light 81 of incident light 80 is therefore outputted to the outside of the vehicle. On the other hand, when the sun 31 is positioned at a low position corresponding to that in morning or evening so as to act as a low-position solar radiation source 31, an incident light 82 of the solar radiation enters a passenger compartment through windshield 1 and is absorbed by light shielding walls of angle selective transparent sheet 3. Therefore, such incident light 82 does not reach an eye of a vehicle occupant.

Herein, a sheet material having reflection characteristics dependent on the incident angle of light is called an angle selective reflection sheet. This angle selective reflection sheet functions as a reflection sheet against a solar radiation radiated from the sun at a high position corresponding to the position of sun in broad daylight, and function as an absorption member against a solar radiation whose radiating direction is symmetrical to the direction of a sightline of the vehicle occupant with a perpendicular plane of angle selective reflection sheet. The present invention is based on these functions of the angle selective reflection sheet.

(Angle Selective Transparent Sheet)

Angle selective transparent sheet 3 employed in the angle selective reflection sheet according to the present invention is a sheet having the characteristics of allowing light to pass through the sheet when the incident angle of the light is within a predetermined angle range and of prohibiting light to pass through the sheet when the incident angle of the light is outside of the predetermined angle range.

Figure 3:
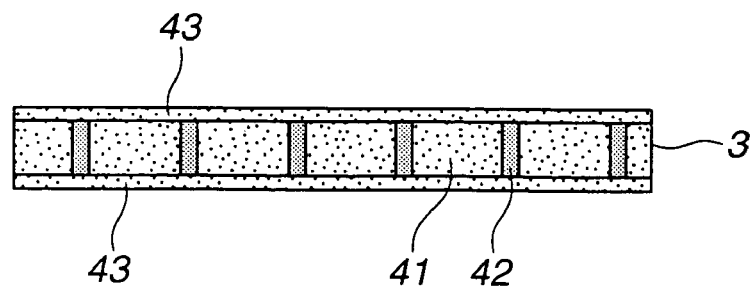
FIG. 3 is a view showing a structure of the angle selective reflection sheet according to the present invention, wherein non-transparent light shielding walls are regularly aligned in a transparent resin sheet, and the sheet is laminated by reinforcement films.

FIG. 3 shows a cross sectional view of angle selective transparent sheet 3 which is constructed by arranging light shielding walls (louver) 42 in a transparent resin film 41 at predetermined space intervals. In order to ensure the strength of this sheet 3, angle selective transparent sheet 3 may be laminated by transparent reinforcement films 43. Even if this reinforcement is applied to angle selective transparent sheet 3, the advantageous function thereof is maintained.

Figure 4:
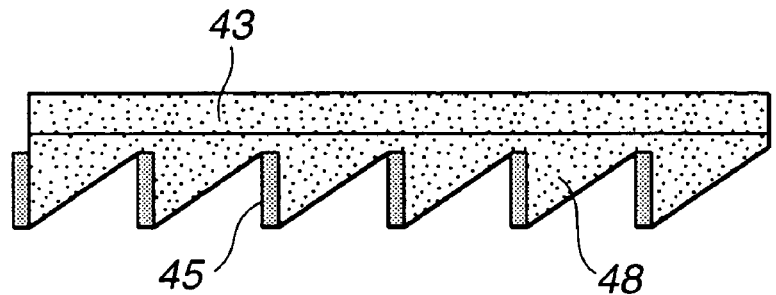
FIG. 4 is a view showing a structure of the angle selective reflection sheet according to the present invention, wherein a light shielding wall is attached to one surface of each sawtooth of a transparent sheet having a sawtooth cross-section.

Further, the angle selective transparent sheet may be constructed such that a light shielding wall 45 is provided at one surface of each sawtooth portion of a transparent sawtoothed sheet 48 which has a sawtooth cross-section as shown in FIG. 4. The sheet having the light shielding walls may be constructed by cellular light shielding wall such as a thin honeycomb member. Such a sheet also may be laminated by transparent reinforcement films 43.

(Louver)

A louver type angle selective transparent sheet 3 having light shielding walls (louver) has a manufacturability such that a resin block is produced by alternatively stacking a transparent sheet and a non-transparent sheet corresponding to a light shielding wall and that the produce resin block is sliced into the aimed sheet. Hereinafter, there will be mainly discussed the louver type angle selective transparent sheet 3 having light shielding walls (louver) 42 in order to make clear the principle and the function of the angle selective transparent sheet according to the present invention). However, it is of course that the present invention is not limited to such a louver type angle selective transparent sheet.

A transparent sheet constructing a light transmittable part of angle selective transparent sheet 3 is selectable from transparent resins, such as a thermoplastic resin including styrene, methyl methacrylate, polycarbonate and polypropylene, and a transparent rubber including silicon resin.

A non-transparent sheet functioning as a light shielding wall is selectable from sheets which are produced by dispersing pigment such as carbon, titanium oxide and zinc oxide in the above discussed transparent resins and rubber. A sheet coated by a non-transparent paint may be employed as the non-transparent sheet for a light shielding wall. Further, a foil or metal deposited resin-sheet may be employed as the non-transparent sheet for a light shielding wall, since foil and metal deposited resin-sheet are superior in light shielding performance.

(Effective Reflection Angle of Louver)

The louver type angle selective transparent member is preferably applicable to the angle selective reflection sheet according to the present invention since the production method of the louver type angle selective transparent member is capable of easily controlling a pitch of light shielding walls (louver) 42 by varying a thickness of a transparent sheet and a thickness of a non-transparent sheet, of controlling a height of light shielding walls (louver) 42 by controlling a slicing thickness of sheet from the laminated block, and of controlling a slant angle of the light shielding walls (louver) 42 by controlling a slicing angle from the laminated block.

Figure 5:
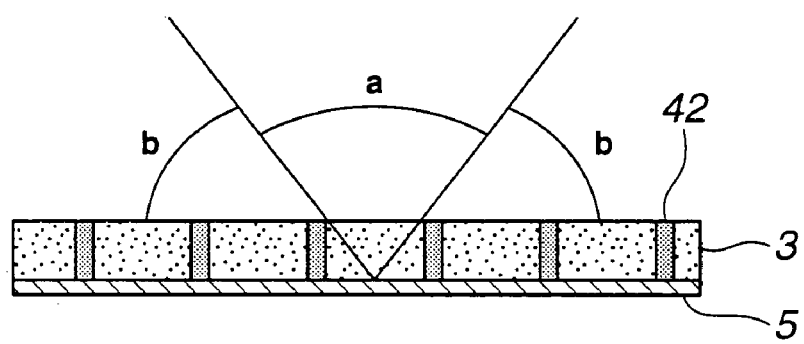
FIG. 5 is a view explaining an effective reflection angle of the angle selective reflection sheet.

There is discussed the reflection characteristics of the angle selective reflection sheet according to the present invention, in relation with the design requirement of light shielding walls (louver) 42. FIG. 5 is a view for explaining an effective reflection angle a of the angle selective reflection sheet. An angle formed by a pair of lines connecting a center between adjacent light shielding walls 42 and top edges of the two adjacent light shielding walls 42 is defined as an effective reflection angle a as shown in FIG. 5. An angle defined by a surface of the angle selective reflection sheet 3 and the line connecting the center between adjacent light shielding walls and the top edge of the shielding wall are a non-reflection angle b. Accordingly, by increasing a pitch of light shielding walls (louver) 42, effective reflection angle a increases. By increasing the height of light shielding walls (louver) 42, effective reflection angle a decreases. Further, by specifically arranging the reflection on the light shielding walls (louver) 42 as will be discussed later, it becomes possible to control a direction of the effective reflection angle a.

By taking account of the position of locating the angle selective reflection sheet, a position of a vehicle occupant's eye point and an incident angle of the solar radiation, design parameters of light shielding walls (louver) 42 are properly controlled so as to obtain a further preferable function of the angle selective reflection sheet. More specifically, it is possible to determine the design parameters of light shielding walls (louver) 42 so as to increase the effective reflection angle a as far as maintaining the non-reflection characteristic relative to a vehicle occupant's sight line.

(Optical Characteristic of Louver)

Figure 6:
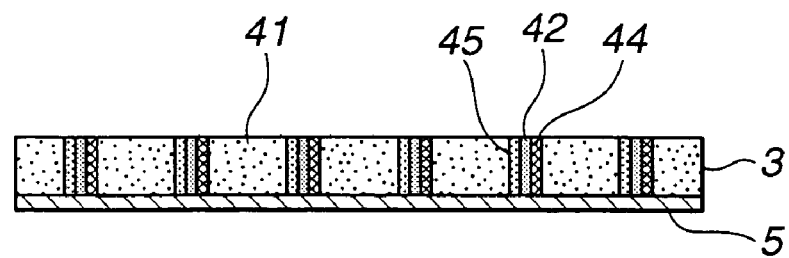
FIG. 6 is a view showing a structure of the angle selective reflection sheet wherein a vehicle occupant facing surface of the light shielding wall is a light absorbing surface and a vehicle external facing surface of the light shielding wall is a light reflection surface.

In order to further improving the advantageous function of the angle selective reflection sheet according to the present invention, it is important to take account of the optical characteristics of front and back surfaces of light shielding wall. FIG. 6 shows a structure of the angle selective reflection sheet which is arranged such that an occupant-facing surface of light shielding wall (louver) 42 facing with a vehicle occupant is constructed by a light absorbing surface 44, and an outside-facing surface of light shielding wall (louver) 42 facing with an outside of the vehicle is constructed by a light reflecting surface 45.

Figure 7:
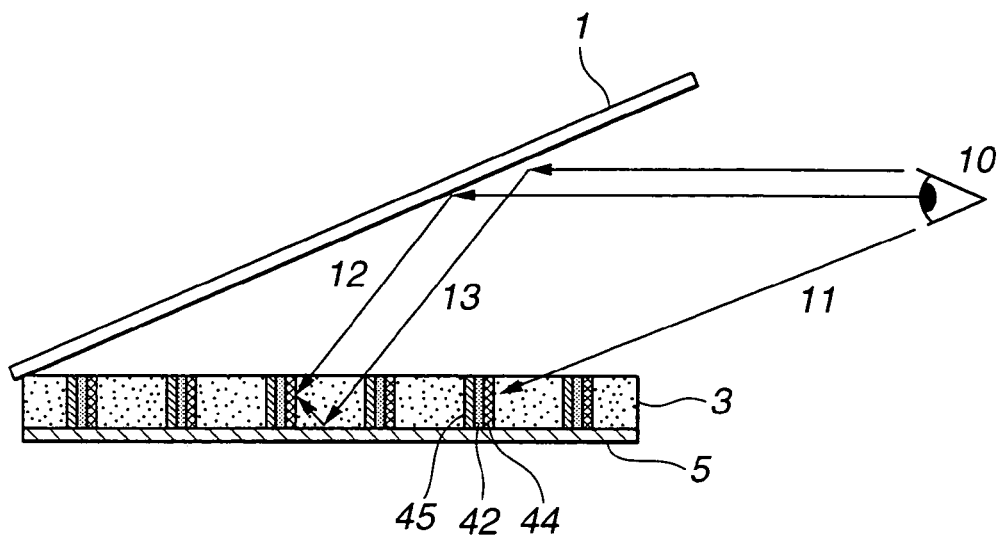
FIG. 7 is a view explaining a windshield reflection sight-line relative to the angle selective reflection sheet.

As shown in FIG. 7, the occupant-facing surface of light shielding wall (louver) 42 is seen on a windshield 1 through a vehicle-occupant direct sight line 12 directed to the instrument panel through windshield and a reflection vehicle-occupant sight line 13 directed to light shielding wall (louver) 42 through windshield 1. That is, a visibility through windshield 1 is degraded if the occupant-facing surface of light shielding wall (louver) 42 is too bright. Therefore, it is preferable that the occupant-facing surface has a low brightness. Further, since the occupant-facing surface is also directly seen by the vehicle occupant through the direct sight line 11 to an instrument panel, the occupant-facing surface determines a design of the interior member. Therefore, in view of the degree of freedom of the antiglare and the design thereof, the upper brightness of the occupant-facing surface of light shielding wall (louver) 42 is suppressed to be lower than or equal to 5.0 in Munsell value (a numeral scale of brightness), and may be set at a color in coordination with the design of the passenger compartment of the vehicle.

Figure 8:
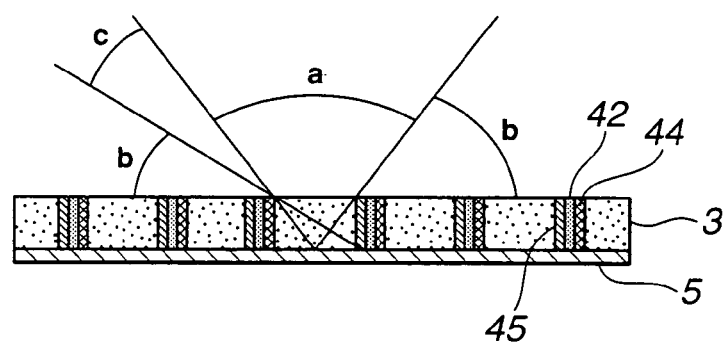
FIG. 8 is a view explaining an extension of an effective reflection angle by employing a light reflection surface at the vehicle external facing surface of the light shielding wall.

On the other hand, by designing the outside-facing surface of light shielding wall (louver) 42 facing with the outside of the vehicle as a light reflecting surface 45, the effective angle of the angle selective reflection sheet is increased. More specifically, as shown in FIG. 8, the effective reflection angle increases in the forward direction by an increased angle c which is increased by designing the outside-facing surface as a reflection surface. By this increase of the effective reflection angle, the reflectance of the angle selective reflection sheet is improved by a value corresponding to the decrease area shaded by light shielding wall (louver) 42, in addition to the increase of the effective reflection angle. This is very advantageous in view of suppressing the temperature rise in the passenger compartment.

Figure 9:
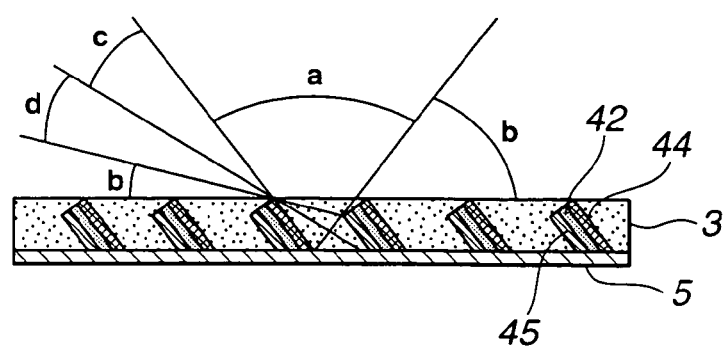
FIG. 9 is a view explaining an extension of the effective reflection angle in case that the light shielding walls are slanted.

Further, by slanting light shielding walls (louver) 42 as shown in FIG. 9, it becomes possible to increase the effective reflection angle by an increased angle d which is increased by slanting the light shielding walls forward relative to the plane of the angle selective reflection sheet. By this arrangement, it becomes possible that the angle selective reflection sheet is capable of reflecting the solar radiation radiated from a wider position range of the sun while maintaining the non-reflection performance to the vehicle occupant.

(Reflection Characteristic of Louver)

Light reflection surface 45 of each light shielding wall (louver) 42 is a surface having a regular reflection characteristic like as a mirror. Such a light reflection surface is obtained by employing a foil such as an aluminum foil, a glare film (metal-spattered film) obtained by depositing or spattering metal on a film, a foil-deposited coating, and a reflection film which is obtained by attaching the foil, the glare film or the foil-deposited coating on a resin film. Further, paint using aluminum pigment may be employed as the light reflection surface 45.

Figure 10:
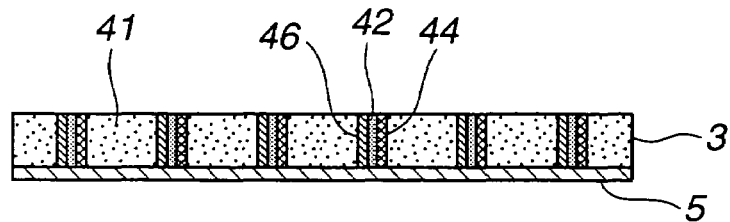
FIG. 10 is a view showing a structure of the angle selective reflection sheet wherein a scattering reflection surface is employed as a reflection surface of each light shielding wall by coating a high-brightness paint on the reflection surface of the light shielding wall.

The light reflection surface also reflects the incident energy in addition to the regular reflection of the light. FIG. 10 shows a structure of the angle selective reflection sheet wherein a scattering reflection surface 46 is formed on a reflection surface of light shielding wall (louver) 42 by coating high-brightness paint including a white pigment such as titanium dioxide or zinc oxide. For example, scattering reflection surface 46 having a white appearance performs a high energy reflectance including scattering light, which is higher than or equal to 90% close to that of a mirror. When this scattering reflection surface 46 is employed as a reflection surface of light shielding wall (louver) 42, it is possible to properly color the reflection surface insofar as that the reflectance there of is not largely degraded. In such a case, by setting Munsell value of the reflection surface at a value higher than or equal to 6.0, the effect of the scattering reflection is ensured.

(Retroreflection)

Figure 11:
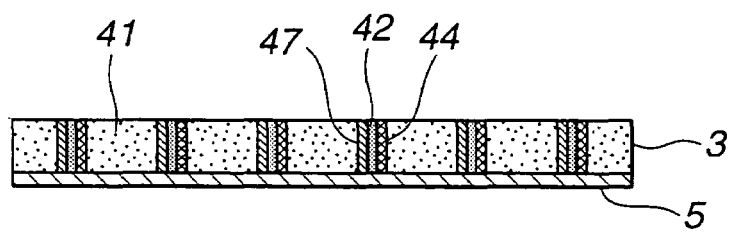
FIG. 11 is a view showing a structure of the angle selective reflection sheet wherein a retroreflection sheet is employed as a reflection surface of each light shielding wall.
Figure 12:
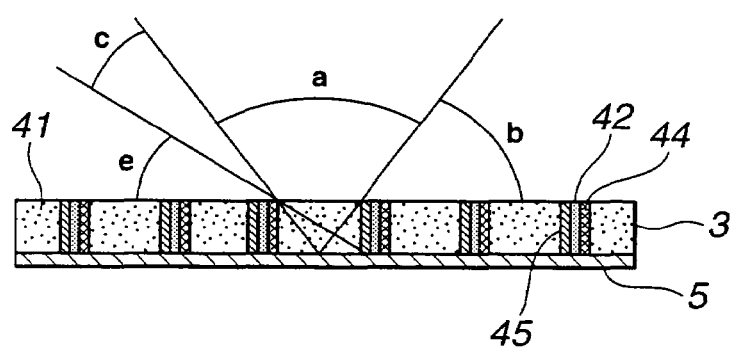
FIG. 12 is a view explaining an extension of the effective reflection angle in case that the retroreflection sheet is employed as a reflection surface.

FIG. 11 shows a structure of the angle selective reflection sheet wherein a retroreflection surface 47 is employed as a reflection surface of light shielding wall (louver) 42. This structure enables the effective reflection angle to be further extended to a range including an extended quantity e due to the retroreflection shown in FIG. 12. Therefore, it is possible to ensure an extremely exceeding effect thereby. Herein, a retroreflection is a characteristic of reflecting an incident light to a light irradiation direction even if the light is irradiated from any direction, by utilizing a light refraction of glass beads or minute three-dimensional prisms such as corner cube reflectors. A retroreflection sheet (retroreflector) is generally used for improving the visibility of a road sign and a billboard. For example, a capsule-lens-type Scotch light reflection sheet produced by SUMITMO 3M Limited and a capsule-lens-type Nica high-brightness sheet produced by NIPPON CARBIDE INDUSTRIES CO., INC. are commercially available and are also industrially available.

(Reflection Layer)

A reflection layer laminated on angle selective transparent sheet 3 is a surface having a regular reflection characteristic like as a mirror, as is similar to the light reflection surface of the aforementioned light shielding wall (louver) 42. Such a reflection layer is obtained by employing a foil such as an aluminum foil, a glare film (metal-spattered film) obtained by depositing or spattering metal on a film, a foil-deposited coating, and a reflection film on which the foil, the glare film or the foil-deposited coating are attached. Further, paint using an aluminum pigment may be employed as a reflection layer.

The reflection layer also reflects the incident energy in addition to the regular reflection of the light as is similar to the light reflection surface 45 of light shielding wall (louver)

Figure 13:
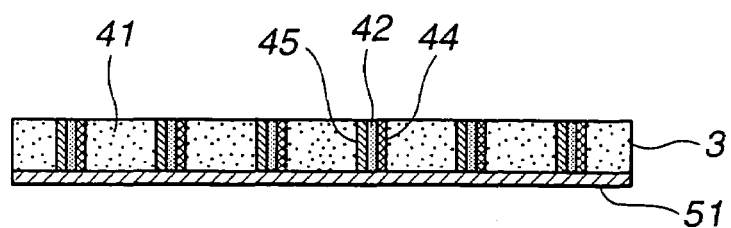
FIG. 13 is a view showing a structure of the angle selective reflection sheet wherein a scattering reflection characteristic is applied to the light reflection surface facing the vehicle outside in the angle selective reflection sheet of FIG. 6.
Figure 14:
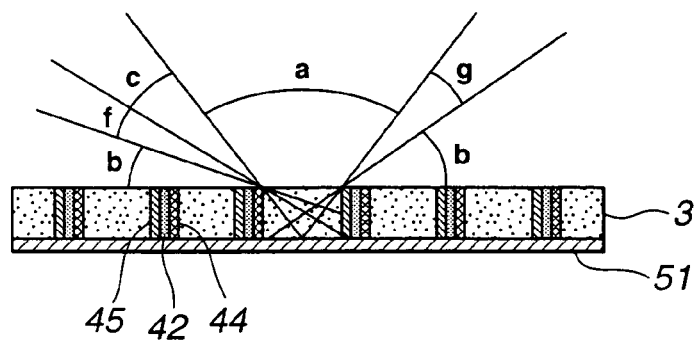
FIG. 14 is a view explaining an extension of the effective reflection angle by employing a scattering reflection surface at the vehicle outside facing surface of the light shielding wall.

42. FIG. 13 shows a structure of the angle selective reflection sheet wherein a scattering reflection layer 51 is employed instead of reflection layer 5 shown in FIG. 6. As shown in FIG. 14, the effective reflection angle is increased in the forward direction by an increased angle f due to the louver scattering reflection surface, in addition to the effective reflection angle a and the increased angle c due to the louver reflection surface in FIG. 8. On the other hand, the effective reflection angle is increased toward the vehicle occupant side only by an increased angle g due to the louver scattering reflection surface. This requires in some cases to adjust the height and the pitch of light shielding wall (louver) 42 so as to prevent the glare due to the increased angle g.

It is also possible to properly color the scattering reflection layer insofar as that the reflectance is not largely degraded. In such a case, by setting Munsell value of the scattering reflection layer at a value higher than or equal to 6.0, the effect of the scattering reflection is ensured. Further, employing paint of file using white pigment as a reflection layer is advantageous to ensure a flexibility of the angle selective reflection sheet as compared with a case of employing a deposition film as a reflection layer.

The structure shown in FIG. 13 is obtained by bonding and laminating a sheet including the scattering reflection surface on angle selective transparent sheet 3. Although this sheet including the scattering reflection surface is not limited in material, it is preferable to employ soft vinyl chloride resin and TPO (thermoplastic olefinic elastomer) as a sheet for the scattering reflection surface in view of a shape following ability of the employed material when the angle selective reflection sheet is employed as a surface member (skin member) of a vehicle interior part. High-brightness paint including white pigment such as titanium dioxide or zinc oxide may be directly coated on one surface of angle selective transparent sheet 3.

(Antireflection Layer)

Figure 15:
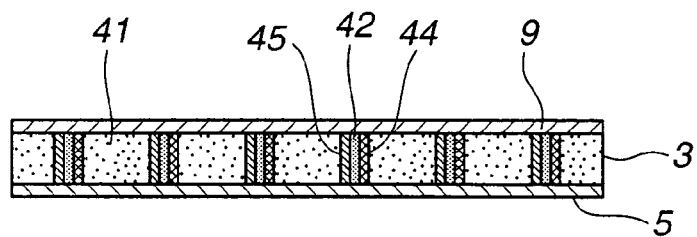
FIG. 15 is a view showing a structure of the angle selective reflection sheet wherein an antireflection layer is formed on a top surface of the angle selective reflection sheet of FIG. 6.

In the concrete application of the angle selective reflection sheet according to the present invention to an interior surface member, if the top surface of the interior part is too glossy, light radiated from the sun positioned at a lower position regularly reflects on the surface of the angle selective reflection sheet so as to prevent the vehicle occupant's eyesight. FIG. 15 shows a structure of the angle selective reflection sheet according to the present invention wherein an antireflection layer 9 is bonded on the top surface of the angle selective reflection sheet. Since the reflection characteristic of the surface of the interior part varies according to a shape and a surface finishing of the interior parts such as a graining, it is difficult to define the performance of the angle selective reflection sheet only by the reflectance. However, it may be almost set such that 60° specular glossiness defined by the method for measurement of specular glossiness by JIS Z8741 is almost smaller than 30%. Accordingly, it is preferable that the glossiness of the antireflection layer is similarly set to be almost smaller than 30%.

Although there have been practically used various antireflection treatments, it is preferable to employ a "graining" in view of design and productivity. A concrete method of executing the graining includes a tooling by a roller and a design reprinting by a slush molding which are commonly known. Glareless paint dispersing silica fine powder may be coated on the top surface of the angle selective reflection sheet.

(On-vehicle Adaptation)

The angle selective reflection sheet obtained by the above-discussed manner exerts the valuable advantages when used as a surface member of vehicle interior parts. Of course, this may be adapted to furniture and interior for housing.

Vehicle interior parts preferable for applying the angle selective reflection sheet according to the present invention include a part, which is disposed at a position receiving solar radiation and is seen from vehicle occupants, such as an instrument panel, an upper portion of a door trim, a pillar and a rear parcel shelf. Specifically, the instrument panel is one of the most effective part for the application of the angle selective reflection sheet.

Subsequently, there are discussed examples of the angle selective reflection sheet according to the present invention.

EXAMPLE 1

(Preparation of Angle Selective Transparent Sheet)

A transparent silicon resin sheet having a thickness of 300 µm was employed as a transparent sheet for the angle selective reflection sheet according to the present invention. A sheet obtained by vapor-depositing aluminum on a 25 µm-thick transparent acrylic sheet was employed as a material for light shielding walls (louver) 42. By coating black glareless paint at a thickness of almost 10 µm on the vapor deposition surface, the light absorbing characteristic of one surface of light shielding walls (louver) 42 was controlled. The transparent sheet and the sheet for louver were laminated by applying a thin acrylic urethane adhesive on an acrylic sheet side of the sheet for louver and by compressing the stacked two sheets through the adhesive by a roller set. Thereafter, a multi layer sheet of a little less than 10 mm thick was obtained by cutting the obtained laminated sheet into 500 mm×500 mm square sheets, by applying adhesive on one surface of each of the 500 mm×500 mm square sheets, by stacking about 20 sheets of the 500 mm×500 mm square sheets and by compressing the stacked sheets by means of hot pressing. Further, a block of about 500 mm thick was obtained by stacking and compressing about 60 sheets of the obtained stacked sheets. The obtained block was sliced into a 300 µm-thick sheet along the sheet-stacked direction of the block using a slicing machine. The sliced sheet was a louver type angle selective transparent sheet which comprises light shielding walls which stand upright with 0° louver angle and each of which has an aluminum-deposited light-reflection surface at one surface and a light absorbing surface at the other surface.

(Preparation of Angle Selective Reflection Sheet)

A reflection sheet obtained by vapor depositing aluminum on a 300 µm-thick soft-vinyl-chloride sheet was bonded and laminated on one surface of the angle selective transparent sheet obtained by the above-discussed method. The other surface of the angle selective transparent sheet is coated by transparent urethane paint including glareless power for preventing a surface reflection. In this manner, an angle selective reflection sheet of a 500 mm×500 mm square was obtained.

(Preparation of Interior Test Piece)

A test piece imitating a vehicle interior was obtained by bonding the above prepared surface member on a laminated sheet of a 5.0 mm-thick urethane foam sheet and a 1.2 mm-thick polypropylene-30%-talc sheet by means of a rubber-adhesive of a room-temperature dry type.

EXAMPLE 2

(Preparation of Angle Selective Transparent Sheet)

A sheet obtained by vapor-depositing aluminum on a 25 µm-thick transparent acrylic sheet was employed as a material for light shielding walls (louver) 42. By coating black glareless paint at a thickness of almost 5 µm on both surfaces of the obtained sheet, light shielding walls (louver) 42 performing the light absorbing characteristic on both surfaces was prepared. The transparent sheet and the sheet for louver were laminated by applying a thin acrylic urethane adhesive on one surface of the sheet for louver and by compressing the stacked two sheets through the adhesive by a roller set. Thereafter, by executing the procedures as same as those of Example 1, the louver type angle selective transparent member, which comprises light shielding walls (louver) 42 each of which has both surfaces performing the light absorbing characteristic, was obtained.

(Preparation of Angle Selective Reflection sheet and Interior Test Piece)

By executing the procedures as same as those of Example 1, a 500 mm×500 mm square angle selective reflection sheet and a test piece imitating a vehicle interior were obtained.

EXAMPLE 3

(Preparation of Angle Selective Transparent Sheet)

A sheet obtained by vapor-depositing aluminum on a 25 μm-thick transparent acrylic sheet was employed as a material for light shielding walls (louver) 42. By coating black glareless paint at a thickness of almost 10 μm on one surface of the obtained sheet for louver and by coating white paint employing titanium dioxide as pigment at a thickness of almost 10 μm on the other surface of the obtained sheet for louver, the light shielding walls (louver) 42 performing a light absorbing characteristic on one surface and a light scattering reflection characteristic on the other surface was prepared. Thereafter, by executing the procedures as same as those of Example 1, the louver type angle selective transparent member which has a light absorbing surface and a light scattering reflection surface was obtained.

(Preparation of Angle Selective Reflection Sheet and Interior Test Piece)

By executing the procedures as same as those of Example 1, a 500 mm×500 mm square angle selective reflection sheet and a test piece imitating a vehicle interior were obtained.

EXAMPLE 4

(Preparation of Angle Selective Transparent Sheet)

A capsule-lens-type Scotch light reflection sheet produced by SUMITMO 3M Limited was employed as a material for light shielding walls (louver) 42. By coating black glareless paint at a thickness of almost 10 μm on a back surface of the prepared sheet for louver, the light shielding walls (louver) 42 performing a light retroreflecting characteristic on the front surface and a light absorbing characteristic on the back surface was prepared. Thereafter, by executing the procedures as same as those of Example 1, the louver type angle selective transparent member which has a light retroreflection surface and a light absorbing surface was obtained.

(Preparation of Angle Selective Reflection Sheet and Interior Test Piece)

By executing the procedures as same as those of Example 1, a 500 mm×500 mm square angle selective reflection sheet and a test piece imitating a vehicle interior were obtained.

EXAMPLE 5

(Preparation of Angle Selective Transparent Sheet)

By executing the procedures as same as those of Example 1, a louver type angle selective transparent member which comprises light shielding walls each of which has an aluminum-deposited light-reflection surface at one surface and a light absorbing surface at the other surface.

(Preparation of Angle Selective Reflection Sheet and Interior Test Piece)

Urethane paint employing titanium dioxide as pigment was coated at a thickness of about 30 μm on one surface of the angle selective reflection sheet, as a reflection sheet. The other surface of the angle selective reflection sheet is coated by transparent urethane paint including glareless power for preventing a surface reflection. In this manner, a 500 mm×500 mm square angle selective reflection sheet was obtained. Further by executing the procedures as same as those of Example 1, a test piece imitating a vehicle interior was obtained.

COMPARATIVE EXAMPLE 1

A black leather-grained soft vinyl chloride used as a surface member for an instrument panel of a vehicle was prepared by cutting into a 500 mm×500 mm square size. Thereafter, by executing the procedures as same as those of Example 1, a test piece imitating a vehicle interior was obtained.

COMPARATIVE EXAMPLE 2

By coating white urethane paint using titanium dioxide as pigment at a thickness of about 30 μm on a surface of the black surface member prepared in Comparative example 1, a reflection layer 5 having a scattering reflection characteristic was formed. The sheet for comparative example 2 was prepared by cutting into a 500 mm×500 mm square size. Thereafter, by executing the procedures as same as those of Example 1, a test piece imitating a vehicle interior was obtained.

(Measurement and Evaluation Method)

As to the prepared test pieces, there were executed an artificial solar radiation test for evaluating a performance of preventing a surface temperature rise and a sensory evaluation for evaluating a vehicle occupant's visibility.

In order to verify the effect of the test pieces on a vehicle, an upper portion of a vehicle instrument panel made by a vinyl chloride surface member and an urethane foam layer was actually cut out at a 500 mm×500 mm square size, and the test piece of Example 1 was fitted in the cut-out space using a room-temperature drying type rubber adhesive. Thereafter, as to the test piece of Example 1, the evaluation test was executed in an environmental test room to be compared with a current part.

(Artificial Solar Radiation Test at 20° Incident Angle)

Figure 16:
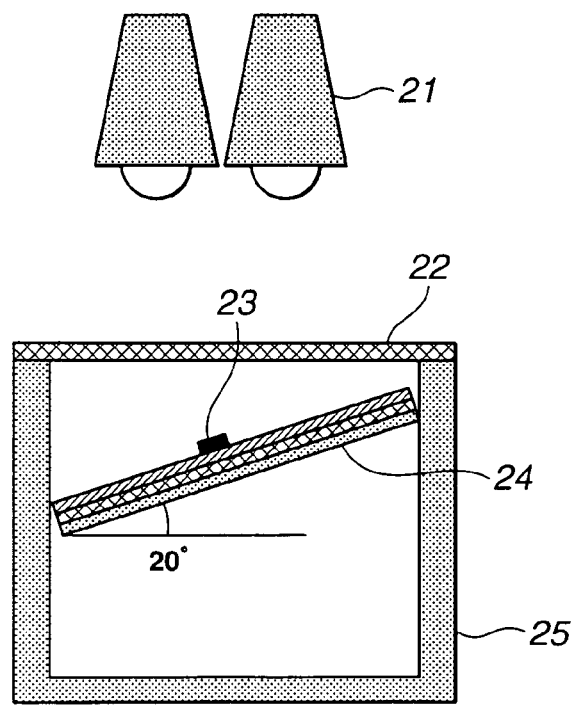
FIG. 16 is a view showing an experiment apparatus for executing an artificial solar radiation test.

As shown in FIG. 16, a test piece 24 of angle selective reflection sheet cut into a size of 300 mm×300 mm square was set in a heat insulating box 25, and a 3.5 mm-thick vehicle green glass 22 imitating a windshield (solar radiation rate is 60% according to JIS R3106) was set at a position apart from the test piece by about 100 mm in order to imitate the temperature rise in a vehicle. Assuming that solar radiation in the summer season culminant is emitted from the front of the vehicle into a passenger compartment, the test piece was set at 20° slanted position and the reflection surfaces of light shielding walls (louver) 42 are faced with a light source. A thermo-couple 23 was set at a surface of the laminated member (test piece) to measure a change in temperature. A solar simulator (SERIC LTD.) 21, which comprises four 500-watt artificial solar lights, was set above the test piece so that a radiation energy density at the glass surface is set at 767 W/m$^2$ (watts per square meter). The measurement of the temperature of the test piece was executed in a room air-conditioned at 25° C. when 60 minutes has passed from the start of light irradiation, that is, when it is assumed that the temperature rise of the surface of the test piece generally reached a saturated temperature.

(Artificial Solar Radiation Test at 45° Incident Angle)

Figure 17:
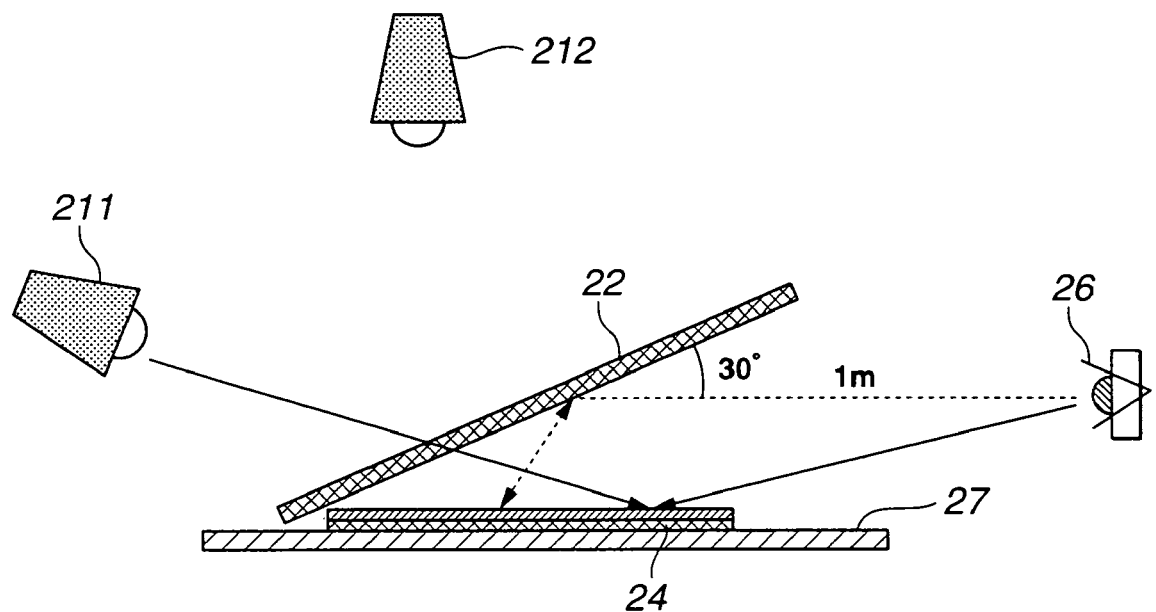
FIG. 17 is a view showing an experiment apparatus for a regular reflection sensory evaluation and a windshield reflection sensory evaluation.

This experiment was executed using an experimental arrangement shown in FIG. 17. The test piece for this experiment was set at 45° slanted position on the assumption that solar radiation in the summer season 9 am or 3 pm (that is, a little slant position) is emitted from the front of the vehicle into a passenger compartment. The other test conditions and measurement were set as same as those of the above-discussed 20° incident angle test.

(Regular Reflection Sensory Evaluation)

As shown in FIG. 17, a 500 mm×500 mm square flat plate 22 of 3.5 mm-thick vehicle green glass for a vehicle windshield (solar radiation rate is 60% according to JIS R3106) was set at a 30° slanted position relative to a horizontal surface, above a black woolen-like paper 24. A 500 W solar simulator (SERIC LTD.) 211 was set at a position, which is opposite to a vehicle occupant's eyepoint 26 through the test piece 24 while 1 m apart from the test piece 24, and illuminated the test piece 24. A degree of the reflection of the test piece of angle selective reflection sheet 24 was visually evaluated. When the result of the visual evaluation compared favorably with a convention example, it was denoted by a mark ◯. When the result of the visual evaluation was slightly glaring with little concern, it was denoted by a mark Δ. When the result of the visual evaluation was apparently glaring so as to degrade the occupant's eyesight, it was denoted by a mark X.

(Windshield Reflection)

As shown in FIG. 17, a 500 mm×500 mm square flat plate 22 of 3.5 mm-thick vehicle green glass for a vehicle windshield (solar radiation rate is 60% according to JIS R3106) was set at a 30° slanted position relative to a horizontal surface, above a black woolen-like paper 24. A 500 W solar simulator (SERIC LTD.) 212 was set above the test piece 24 of while 2 m apart from the test piece 24, and illuminated the test piece 24.

A degree of the windshield reflection to the test piece of angle selective reflection sheet 24 was visually evaluated. When the result of the visual evaluation compared favorably with a convention example, it was denoted by mark ◯. When the result of the visual evaluation was slightly reflecting with little concern, it was denoted by mark Δ. When the result of the visual evaluation was apparently reflecting so as to degrade the occupant's eyesight, it was denoted by mark X.

(Evaluation under On-vehicle Condition)

Figure 18:
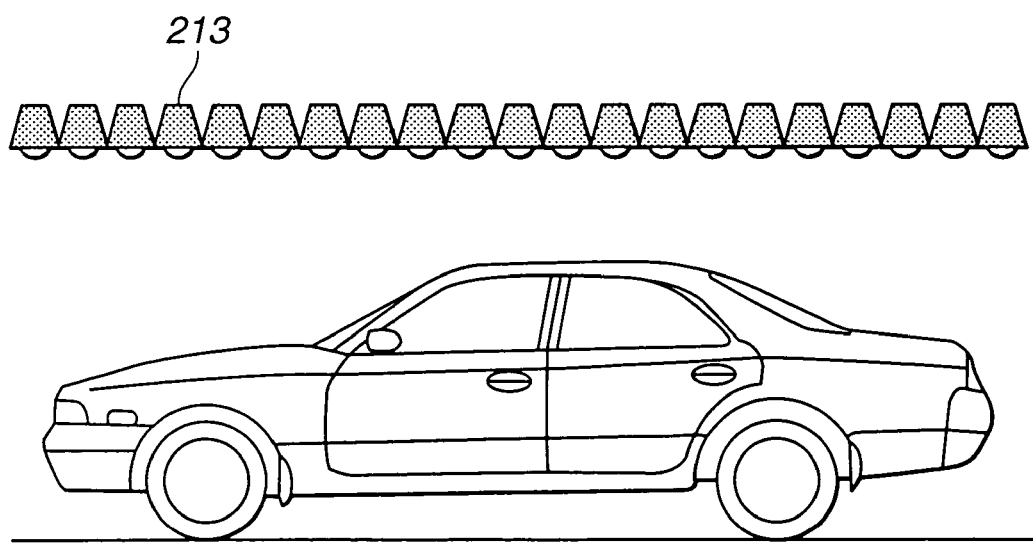
FIG. 18 is a view showing an experiment apparatus for an on-vehicle evaluation.

A 300 mm×300 mm square upper flat portion of an instrument panel was removed (including a surface member and urethane foam layer). A 300 mm×300 mm square plate obtained in Example 1 was attached to the cutout portion of the instrument panel using a room-temperature-dry type rubber adhesive. The vehicle equipped with the test piece of Example 1 was set in an environmental test room equipped with infrared lamps, a blower and an air-conditioning equipment, as shown in FIG. 18. Thereafter, an environment of the test room was controlled under the following conditions.

Solar radiation intensity: 767 W/m$^2$
Temperature: 35° C.
Humidity: 70% RH (relative humidity)
Wind velocity: 0.8 m/sec.

After the vehicle was soaked in this environment, a surface temperature of the test piece of Example 1 was measured using a thermocouple. For the comparison, a currently equipped surface member at the other part of the instrument panel was simultaneously measured.

Hereinafter, there is discussed the test result with reference to Table 1.

EXAMPLES

|  | Louver | | |
| --- | --- | --- | --- |
|  | Exterior Side | Interior Side | Reflection Layer |
| Example 1 | Al Vapor Deposition (Regular Reflection Surface) | Black Paint (Absorption Surface) | Al Vapor Deposition (Regular Reflection Surface) |
| Example 2 | Black Paint (Absorption Surface) | Black Paint (Absorption Surface) | Al Vapor Deposition (Regular Reflection Surface) |
| Example 3 | White Paint (Scattering Reflection Surface) | Black Paint (Absorption Surface) | Al Vapor Deposition (Regular Reflection Surface) |
| Example 4 | Scotch light (Retroreflection Surface) | Black Paint (Absorption Surface) | Al Vapor Deposition (Regular Reflection Surface) |
| Example 5 | Al Vapor Deposition (Regular Reflection Surface) | Black Paint (Absorption Surface) | White paint (Scattering Reflection Surface) |
| Comparative Example 1 | — | — | Current Black Surface Member |
| Comparative Example 2 | — | — | Current White Surface Member |

TABLE 1

|  | Artificial Solar Radiation Test 20° angle (° C.) | Artificial Solar Radiation Test 45° angle (° C.) | Regular Reflection Sensory Evaluation | Windshield Reflection Sensory Evaluation | On-Vehicle Evaluation Surface Temp. (° C.) |
| --- | --- | --- | --- | --- | --- |
| Example 1 | 64.2 | 78.5 | ◯ | ◯ | 69.4 |
| Example 2 | 77.5 | 83.5 | ◯ | ◯ | — |
| Example 4 | 68.6 | 75.2 | ◯ | Δ | — |
| Example 5 | 69.5 | 69.8 | ◯ | ◯ | — |
| Example 6 | 68.7 | 71.6 | ◯ | Δ | — |
| Comparative Example 1 | 88.3 | 82.3 | ◯ | ◯ | 90.2 |
| Comparative Example 2 | 60.5 | 58.5 | X | X | — |

In the artificial solar test wherein the test piece was set with 20° incident angle relative to the direction of the solar radiation, under a condition that a temperature of a conventional surface member reaches 88° C., all of Examples 1 through 5 performed a temperature-rise suppressing effect.

More specifically, the temperature-rise suppressing effect of Example 1 was 24° C. as compared with the conventional surface member of the instrument panel since Example 1 is arranged such that a regular reflection surface performing a high reflection efficiency was employed as one surface of light shielding walls (louver) 42 and a reflection layer. The temperature-rise suppressing effect of Example 2 was around 10° C. since both surfaces of each light shielding wall (louver) 42 were light absorbing surfaces, which decrease a ratio of the reflection surface as compared with Example 1. The temperature-rise suppressing effects of Examples 3 and 5 were slightly smaller than that of Example 1 since reflected light was partly absorbed by the light absorbing surface of light shielding walls (louver) 42 due to the use of the scattering reflection surface as a reflection surface of the light shielding wall. The temperature-rise suppressing effect of Example 5 was also smaller than that of Example 1 since the reflectance of the retroreflection is not high such as about 55% of the regular reflection.

In the artificial solar test wherein the test piece was set with 45° incident angle relative to the direction of the solar radiation, the temperature of a conventional surface member reached 82° C. Under this condition, Example 2 performed no temperature-rise suppressing effect due to the smaller effective reflection angle a. The temperature-rise suppressing effect of Example 1 was around 4° C. since the effective reflection area is not so large. On the other hand, the temperature-rise suppressing effects of Examples 3, 4 and 5 were large such as 7° C. through 12° C. since the effective reflection angles thereof were large due to the employment of scattering reflection or retroreflection.

In the regular reflection sensory evaluation test, all of Examples 1 through 5 preferably cut the regular reflection of the reflection layer. Further, a surface reflection of the angle selective reflection sheet was suppressed to eliminate the reflection light of preventing the vehicle occupant's eyesight, due to the reflection preventing treatment on the surface of the angle selective reflection sheet. On the other hand, Example 2 impressed a glaring in some degree due to the light directing in the regular reflection although the surface of the angle selective reflection sheet was a white scattering reflection surface.

In the windshield reflection sensory evaluation test, Examples 1, 2 and 4 preferably suppressed the windshield reflection so as to ensure the preferable eyesight of the vehicle occupant. Example 3 almost ensured the eyesight although the scattering reflection of light shielding walls (louver) 42 slightly brightened the surface of the instrument panel to be bright than a conventional instrument panel. Example 5 also ensured the eyesight although a white tone of the reflection layer, which is smaller in area that the black painted surface of light shielding walls (louver) 42 was slightly reflected by the windshield.

In the on-vehicle evaluation, as is similar to the test result of the test pieces, the temperature-rise suppressing effect of Example 1 was around 20° C. The result derives that the angle selective reflection sheet gains a desired effect when actually employed in the vehicle.

This application is based on Japanese Patent Applications No. 2003-167016 filed on Jun. 11, 2003 in Japan. The entire contents of these Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An angle selective reflection sheet comprising:
   an angle selective transparent sheet having a characteristic of selectively allowing light to pass through the angle selective transparent sheet according to an incident angle of the light to the angle selective transparent sheet, the angle selective transparent sheet comprising light shielding walls arranged in a transparent resin; and
   a reflection layer laminated on a surface of the angle selective transparent sheet, wherein one surface of the light shielding walls is a light absorbing surface, and an other surface of the light shielding walls is a light reflecting surface.

2. The angle selective reflection sheet as claimed in claim 1, wherein a Munsell value of the light reflecting surface of the light shielding walls is higher than or equal to 5.0.

3. The angle selective reflection sheet as claimed in claim 1, wherein the light reflecting surface of the light shielding walls includes a scattering reflection surface whose Munsell value is higher than or equal to 6.0.

4. The angle selective reflection sheet as claimed in claim 1, wherein the light reflecting surface includes a regular reflecting surface which is selected from at least one of a metal vapor deposition film, a sputtered metal film, a foil, a foil dispersed coating or a reflection film produced by attaching at least one of the metal vapor deposition film, the sputtered metal film, the foil or the foil dispersed coating on a resin film.

5. The angle selective reflection sheet as claimed in claim 1, wherein the light reflecting surface includes a retroreflection surface.

6. The angle selective reflection sheet as claimed in claim 1, wherein an antireflection layer is formed on an other surface of the angle selective transparent sheet.

7. The angle selective reflection sheet as claimed in claim 1, wherein the angle selective transparent sheet is obtained by alternately laminating and connecting a transparent sheet and a light shielding wall member sheet, and by slicing a block of the laminated sheets along the sheet laminated direction of the block.

8. The angle selective reflection sheet as claimed in claim 1, wherein the light shielding walls are arranged in the transparent resin at predetermined space intervals so that both surfaces of each light shielding wall are generally perpendicular to a surface of the angle selective transparent sheet.

9. The angle selective reflection sheet as claimed in claim 1, wherein the angle selective transparent sheet has characteristics of allowing light to pass through the angle selective transparent sheet when the incident angle of the light is within a predetermined angle range and of prohibiting light to pass through the angle selective transparent sheet when the incident angle of the light is outside of the predetermined angle range.

10. A vehicle comprising:
    an angle selective reflection sheet comprising an angle selective transparent sheet which has a characteristic of selectively allowing light to pass through the angle selective transparent sheet according to an incident angle of the light to the angle selective transparent sheet, the angle selective transparent sheet comprising light shielding walls arranged in a transparent resin; and a reflective layer laminated on a surface of the angle selective transparent sheet, wherein one surface of the light shielding walls is a light absorbing surface, and an other surface of the light shielding walls is a light reflecting surface;

wherein the angle selective reflection sheet is used as a surface member of at least one of an instrument panel, a door trim, a rear parcel shelf, a pillar garnish and a steering wheel.

* * * * *